United States Patent [19]
Dudley et al.

[11] Patent Number: 5,144,133
[45] Date of Patent: Sep. 1, 1992

[54] UNCOOLED INFRARED DETECTOR READOUT MONOLITHIC INTEGRATED CIRCUIT WITH INDIVIDUAL PIXEL SIGNAL PROCESSING

[75] Inventors: Dana Dudley, Dallas; Kirk D. Peterson, Plano; Charles M. Hanson, Richardson, all of Tex.

[73] Assignee: Texas Instruments Incorporated, Dallas, Tex.

[21] Appl. No.: 680,210

[22] Filed: Apr. 4, 1991

[51] Int. Cl.$^5$ ............................................. H01J 40/14
[52] U.S. Cl. .................................. 250/208.1; 250/332
[58] Field of Search ............ 250/208.1, 208.2, 214 R, 250/214 A, 214 RC, 338.1, 338.4, 332; 357/30 H; 358/213.12, 213.27, 213.28

[56] References Cited

U.S. PATENT DOCUMENTS 4,967,082  10/1990  Cooke et al. ........................ 250/332
5,043,820  8/1991  Wyles et al. ...................... 250/208.1

Primary Examiner—David C. Nelms
Attorney, Agent, or Firm—Richard L. Donaldson; René E. Grossman

[57] ABSTRACT

A monolithic infrared detector readout circuit for a capacitive detection element wherein a high gain preamplifier is biased by a large amplifier feedback resistance, on the order of $10^{12}$ ohms. The output of the preamplifier is bandlimited by a low pass single-pole filter having a high value resistor on the order of $10^9$ ohms and then is buffered prior to being multiplexed by row address signals. The output from the multiplexer switch is then applied to the column line for output to a video circuit or the like.

24 Claims, 1 Drawing Sheet

UNCOOLED INFRARED DETECTOR READOUT MONOLITHIC INTEGRATED CIRCUIT WITH INDIVIDUAL PIXEL SIGNAL PROCESSING

BACKGROUND OF THE INVENTION

1. FIELD OF THE INVENTION

This invention relates to a monolithic readout circuit for an uncooled infrared detector and, more specifically, to such a circuit wherein the signal-to-noise ratio of the sensing capacitors is improved.

2. BRIEF DESCRIPTION OF THE PRIOR ART

In order to enhance the performance of infrared detector readout circuits, it is desirable to limit the bandwidth of the detector noise above the signal frequency. For example, with a chop (signal) frequency of 30 Hz, a low pass filter with a 3 db frequency of 60 Hz is desirable. The time constant for the filter would require either a very large resistor or a large capacitor within each unit cell. Using MOS technology, a capacitance of about 1 pF/mil$^2$ is available, which, for a typical focal plane array (FPA) pitch (1 to 4 mils) yields about 1.0 pF, and combined with typical circuit impedances (1K to 1M ohms), yields a time constant far below that required for a 60 Hz bandwidth. A different approach from that of the prior art is therefore required.

Biasing of a capacitive detector element has been achieved in the prior art by a reset switch in series with the capacitor to be charged which, when closed, provides a low impedance path from the capacitor to a biasing voltage. When the reset switch is then opened, the capacitor retains the charge placed thereon during the period when the reset switch was closed. Voltage setting in this manner leaves a noise voltage behind whose RMS value is equal to $(kT/C_{det})^{\frac{1}{2}}$ where k is Boltzmann's constant and the temperature is measured in degrees Kelvin. This error can be removed by a double correlated sample algorithm in conjunction with a large external memory as described in U.S. Pat. No. 4,671,593. This subtraction requirement is a hindrance and, additionally, is incompatible with the low frequency, low pass filter mentioned above because the reset error pedestal cannot quickly pass through the filter for sampling. Continuous detector biasing through a very high impedance is therefore desirable when a low noise bandwidth is used. Reverse biased diodes have been used for this purpose, however significant leakage current from the detector can create large and non-uniform voltage across the diodes.

High gain for the amplifiers is desirable so that downstream noise, such as that of the filter, is low with respect to detector noise. This is difficult to achieve using typical MOS (not CMOS) common source amplifiers, which require large width to length ratio mismatches (large area) and large bias supplies (increased power). Also, amplifier biasing using a common supply is a problem because of MOS threshold voltage nonuniformity across the array.

SUMMARY OF THE INVENTION

In accordance with the present invention, the above noted deficiencies of the prior art are minimized and there is provides a monolithic infrared detector readout circuit for a capacitive detection element wherein a high gain preamplifier is biased by a large amplifier feedback resistance, on the order of $10^{12}$ ohms. The output of the preamplifier is bandlimited by a low pass single-pole filter having a high value resistor on the order of $10^9$ ohms and then is buffered prior to being multiplexed by row address signals. The output from the multiplexer switch is then applied to the column line for output to a video circuit or the like.

DESCRIPTION OF THE PREFERRED EMBODIMENT

Figure 1:
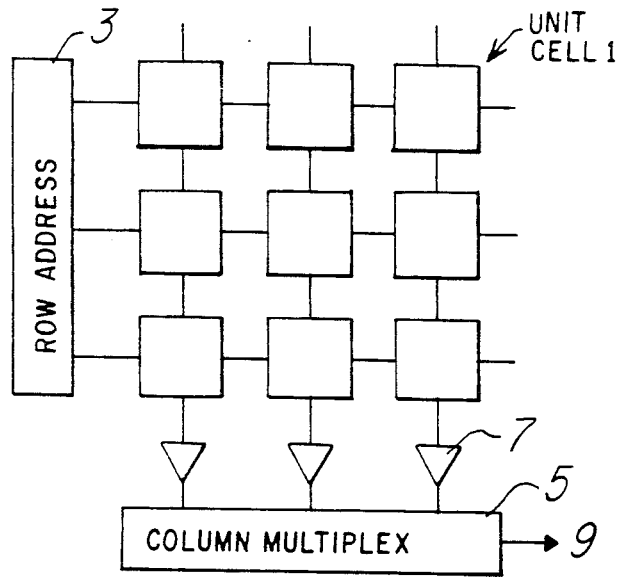
FIG. 1 is a schematic diagram of a typical monolithic address matrix for a focal plane processor in accordance with the present invention.

Referring first to FIG. 1, there is shown a typical monolithic address matrix for a focal plane array processor wherein each unit cell 1 biases, amplifies and band-limits the signals generated by each pixel and the unit cell outputs are interrogated via the row address circuit 3 and column multiplex circuit 5 via amplifiers 7 and transferred to the video output 9.

Figure 2:
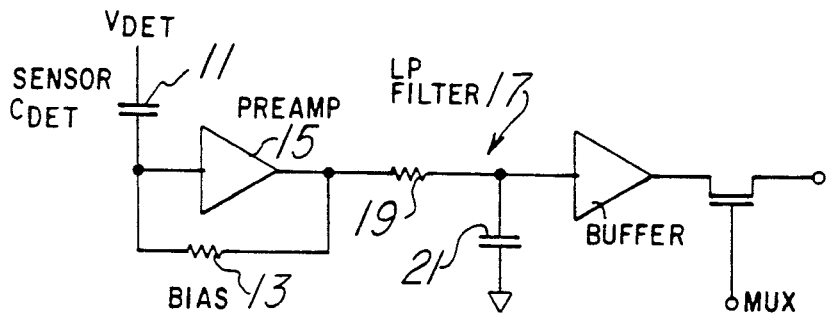
FIG. 2 is a block diagram of a unit cell in accordance with the present invention.

Each unit cell 1 is shown in detail in FIG. 2. The unit cell corresponds to a pixel of a focal plane array and includes a sensing element 11 which is depicted as a capacitor wherein the voltage thereacross changes with change in temperature thereof, such sensing elements being well known in the art, examples thereof being barium strontium titanate, lithium tantalate and triglycine sulfate. The sensor, which absorbs infrared energy and turns it into thermal energy, is also known as a thermal detector. The challenge herein is to provide the appropriate bias resistor 13 across the preamplifier 15. A reset transistor has been used in the prior art. However, at each reset, the reset transistor places noise on the line which is undesirable. In accordance with the present invention, a very high value resistance resistive bias is provided. Noise from the resistor 13 is minimized by making the resistance value of the resistor so large that the noise is well below the chop frequency, 30 Hz or below about 10 Hz. Therefore, the noise can be subtracted out by downstream high pass filtering. It is therefore desirable to obtain a resistance in resistor 13 of about $10^{12}$ ohms or higher. Also, the resistor 13 is placed in the feedback loop of the preamplifier 15 in order to provide high gain to control the DC biasing of the preamplifier 15 and insure that the preamplifier 15 is not in saturation. It is also desirable to roll off the high frequency noise associated with both the preamplifier 15 and the detector or sensor 11, a low pass filter being required for this function. This is accomplished with the low pass filter 17 composed of resistor 19 and capacitor 21 wherein the resistor 19 has a resistance of about $10^9$ ohms and the capacitor 21 has a capacitance of about 0.3 picofarads.

Figure 3:
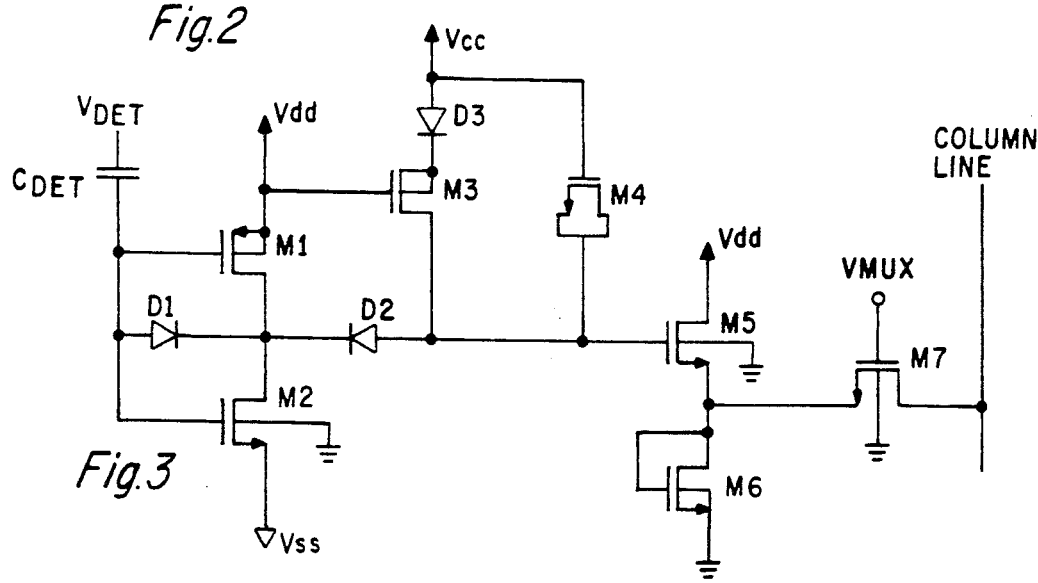
FIG. 3 is a circuit diagram of the unit cell of FIG. 2.

To obtain the bias resistance of about $10^{12}$ ohms and the low pass filter resistance of $10^9$ ohms, diodes are used. The detector 11 has a small leakage current of about $10^{-13}$ to about $10^{-15}$ amperes which trickles through the diode D1 of FIG. 3, the diode D1 providing the function of resistor 13. Transistors M1 and M2 are the CMOS inverter corresponding to the inverter or preamplifier 15 of FIG. 2. The bias resistance provided by diode D1 must be sufficiently high, (i.e., above about $10^{12}$ ohms), however it has a high upper limit. Therefore the amount of current passing through the diode D1 on the low end is of little concern. The low pass filter 17 is composed of diode D2 which represents the resistor 19 of FIG. 2 and transistor M4. The bandwidth of the filter 17 must be controlled, so the amount of current passing through the diode D2 is of concern. Therefore, diode D3 and transistor M3 operate as a current generating circuit and control the current through diode D2. Transistor M4 is a MOSFET in the turned on state which operates as the capacitor 21. Transistors M5 and M6 are the buffer 23 of FIG. 2 and transistor M7 is the multiplex switch 25 of FIG. 2 through which the output to the column line is provided. The multiplex switches 25 of FIG. 2 and transistor M7 of FIG. 3 are controlled by the row address circuit as shown in FIG. 1.

Referring again to FIG. 3, the operation of the circuit will be explained. The circuit of FIG. 3 will always be on except for the multiplex switch 25 which is turned on and off by the row address circuit 3 of FIG. 1. The only input signal to the circuit is provided at the detector 11 which is used with a chop system (not shown) wherein the input signal to the detector is time dependent due to the chopping of the signal, even when the scene being detected is constant. The chopping causes the signal at the detector to appear as a 30 Hz sine wave. The bandwidth of the circuit is limited at the high end by the low pass filter 17 so that the noise is band-limited into the low end at under about 60 Hz. There is also high pass noise filtering below 10 Hz. It is for this reason that the bias resistor 13 must have such a high value. As stated above, the resistance of diode D1 is very high because the current passing therethrough is maintained at a very low value. In order to obtain about $10^9$ ohms of resistance at diode D2, a current of about $10^{-11}$ amperes is passed through diode D2, this current being determined by the voltage across diode D3 controlled by $V_{cc}$, wherein $V_{cc}$ can be varied. All of the transistors are preferably MOSFETs with a complementary pair desired for the preamplifier 15 to obtain the high gain. The diodes D1 and D2 must be forward biased in order to provide good control of the resistance values thereof.

The diodes D1 and the circuit combination of diodes D2 and D3 and transistor M3, which are utilized herein to provide very high resistance in a monolithic circuit can be replaced by very lightly doped polysilicon which is substantially intrinsic.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A detector circuit which comprises, in combination:
   (a) a matrix of unit cells;
   (b) a row address circuit controlling operation of each of said unit cells; and
   (c) a column address circuit coupled to each of said unit cells;
   (d) each of said unit cells comprising:
      (i) a capacitive detector;
      (ii) an amplifier having an input coupled to said detector and an output, and a very high resistance feedback circuit coupled between said input and said output;
      (iii) a low pass filter coupled to the output of said amplifier; and a switch coupled to said filter.

2. A detector circuit as set forth in claim 1 wherein said high resistance feedback circuit has a resistance of at least about $10^{12}$ ohms.

3. A detector circuit as set forth in claim 1 wherein said high resistance feedback circuit is a forward biased first diode.

4. A detector circuit as set forth in claim 2 wherein said high resistance feedback circuit is a forward biased first diode.

5. A detector circuit as set forth in claim 1 wherein said low pass filter comprises a resistance element having a resistance of about $10^9$ ohms serially coupled between said output of said amplifier and said switch and a capacitance element coupled between said resistance element and a source of reference voltage.

6. A detector circuit as set forth in claim 2 wherein said low pass filter comprises a resistance element having a resistance of about $10^9$ ohms serially coupled between said output of said amplifier and said switch and a capacitance element coupled between said resistance element and a source of reference voltage.

7. A detector circuit as set forth in claim 3 wherein said low pass filter comprises a resistance element having a resistance of about $10^9$ ohms serially coupled between said output of said amplifier and said switch and a capacitance element coupled between said resistance element and a source of reference voltage.

8. A detector circuit as set forth in claim 4 wherein said low pass filter comprises a resistance element having a resistance of about $10^9$ ohms serially coupled between said output of said amplifier and said switch and a capacitance element coupled between said resistance element and a source of reference voltage.

9. A detector circuit as set forth in claim 5 wherein said resistance element is a forward biased second diode and a current source coupled to an electrode of said second diode for delivering a predetermined current to said second diode.

10. A detector circuit as set forth in claim 6 wherein said resistance element is a forward biased second diode and a current source coupled to an electrode of said second diode for delivering a predetermined current to said second diode.

11. A detector circuit as set forth in claim 7 wherein said resistance element is a forward biased second diode and a current source coupled to a electrode of said second diode for delivering a predetermined current to said second diode.

12. A detector circuit as set forth in claim 8 wherein said resistance element is a forward biased second diode and a current source coupled to an electrode of said second diode for delivering a predetermined current to said second diode.

13. A unit cell for use in a detector circuit comprising:
   (a) a capacitive detector;
   (b) an amplifier having an input coupled to said detector and an output, and a very high resistance feedback circuit coupled between said input and said output;
   (c) a low pass filter coupled to the output of said amplifier; and a switch coupled to said filter.

14. A circuit as set forth in claim 13 wherein said high resistance feedback circuit has a resistance of at least about about $10^{12}$ ohms.

15. A circuit as set forth in claim 13 wherein said high resistance feedback circuit is a forward biased first diode.

16. A circuit as set forth in claim 14 wherein said high resistance feedback circuit is a forward biased first diode.

17. A circuit as set forth in claim 13 wherein said low pass filter comprises a resistance element having a resistance of about $10^9$ ohms serially coupled between said output of said amplifier and said switch and a capacitance element coupled between said resistance element and a source of reference voltage.

18. A circuit as set forth in claim 14 wherein said low pass filter comprises a resistance element having a resistance of about $10^9$ ohms serially coupled between said output of said amplifier and said switch and a capacitance element coupled between said resistance element and a source of reference voltage.

19. A circuit as set forth in claim 15 wherein said low pass filter comprises a resistance element having a resistance of about $10^9$ ohms serially coupled between said output of said amplifier and said switch and a capacitance element coupled between said resistance element and a source of reference voltage.

20. A circuit as set forth in claim 16 wherein said low pass filter comprises a resistance element having a resistance of about $10^9$ ohms serially coupled between said output of said amplifier and said switch and a capacitance element coupled between said resistance element and a source of reference voltage.

21. A circuit as set forth in claim 17 wherein said resistance element is a forward biased second diode and a current source coupled to an electrode of said second diode for delivering a predetermined current to said second diode.

22. A circuit as set forth in claim 18 wherein said resistance element is a forward biased second diode and a current source coupled to an electrode of said second diode for delivering a predetermined current to said second diode.

23. A circuit as set forth in claim 19 wherein said resistance element is a forward biased second diode and a current source coupled to an electrode of said second diode for delivering a predetermined current to said second diode.

24. A circuit as set forth in claim 20 wherein said resistance element is a forward biased second diode and a current source coupled to an electrode of said second diode for delivering a predetermined current to said second diode.

* * * * *